(12) United States Patent
Higuchi et al.

(10) Patent No.: US 9,765,448 B2
(45) Date of Patent: Sep. 19, 2017

(54) FLAME RESISTANT POLYMER, POLYMER SOLUTION, FLAME RESISTANT FIBER, CARBON FIBER, AND METHODS OF PRODUCING SAME

(71) Applicant: The University of Tokyo, Tokyo (JP)

(72) Inventors: Tetsunori Higuchi, Tokyo (JP); Mami Sakaguchi, Hakusan (JP)

(73) Assignee: The University of Tokyo (JP)

( * ) Notice: Subject to any disclaimer, the term of this patent is extended or adjusted under 35 U.S.C. 154(b) by 0 days.

(21) Appl. No.: 14/904,455

(22) PCT Filed: Jul. 11, 2014

(86) PCT No.: PCT/JP2014/068545
§ 371 (c)(1),
(2) Date: Jan. 12, 2016

(87) PCT Pub. No.: WO2015/005469
PCT Pub. Date: Jan. 15, 2015

(65) Prior Publication Data
US 2016/0153121 A1    Jun. 2, 2016

(30) Foreign Application Priority Data

Jul. 12, 2013 (JP) .................... 2013-146226

(51) Int. Cl.
| | | |
|---|---|---|
| *D01F 6/18* | (2006.01) | |
| *D01D 5/06* | (2006.01) | |
| *D01F 9/22* | (2006.01) | |
| *C08F 120/44* | (2006.01) | |
| *C08L 33/20* | (2006.01) | |
| *C08F 2/18* | (2006.01) | |
| *C08F 2/44* | (2006.01) | |
| *D01F 1/07* | (2006.01) | |
| *C08F 8/32* | (2006.01) | |
| *C08F 8/06* | (2006.01) | |
| *C08F 8/48* | (2006.01) | |

(52) U.S. Cl.
CPC .................. *D01F 6/18* (2013.01); *C08F 2/18* (2013.01); *C08F 2/44* (2013.01); *C08F 8/06* (2013.01); *C08F 8/32* (2013.01); *C08F 8/48* (2013.01); *C08F 120/44* (2013.01); *C08L 33/20* (2013.01); *D01D 5/06* (2013.01); *D01F 1/07* (2013.01); *D01F 9/22* (2013.01); *C08L 2201/02* (2013.01); *C08L 2201/56* (2013.01); *C08L 2203/12* (2013.01)

(58) Field of Classification Search
CPC .. C08F 120/44; C08F 2/44; C08F 8/48; C08F 8/06; C08F 8/32; C08F 2/18; C08F 20/44; D01D 5/06; D01F 1/07; D01F 6/18; D01F 9/22; C08L 33/20; C08L 2201/56; C08L 2203/12; C08L 2201/02
USPC ............... 423/447.2, 447.1; 264/176.1, 29.2; 524/174; 252/329.1, 377
See application file for complete search history.

(56) References Cited

U.S. PATENT DOCUMENTS 4,397,831 A * 8/1983 Saito .................. D01F 9/32
423/447.2

FOREIGN PATENT DOCUMENTS

| | | |
|---|---|---|
| JP | 2007-031564 A1 | 2/2007 |
| JP | 2008-095257 A | 4/2008 |
| JP | 2009-091397 A | 4/2009 |
| JP | 2009-149712 A | 7/2009 |
| JP | 2009-197358 A | 9/2009 |
| JP | 2013-043904 A | 3/2013 |
| WO | 2005/080448 A1 | 9/2005 |
| WO | 2007/018136 A1 | 2/2007 |

* cited by examiner

*Primary Examiner* — Daniel C McCracken
(74) *Attorney, Agent, or Firm* — DLA Piper LLP (US)

(57) ABSTRACT

A flame resistant polymer is obtained by reacting polyacrylonitrile with amine and nitro compounds, the polyacrylonitrile being polymerized by aqueous suspension polymerization using a redox initiator and containing an S component at an amount of 3,000 μg/g or less. A PAN-based polymer in which both yarn producing properties and flame resistance are improved can be realized.

10 Claims, No Drawings

FLAME RESISTANT POLYMER, POLYMER SOLUTION, FLAME RESISTANT FIBER, CARBON FIBER, AND METHODS OF PRODUCING SAME

TECHNICAL FIELD

This disclosure relates to a flame resistant polymer, a polymer solution, a flame resistant fiber, a carbon fiber, and methods of producing the same.

BACKGROUND

Flame resistant fibers prepared from a raw material of organic fibers such as polyacrylonitrile-based fibers are utilized as the disaster prevention heat insulating material for airplanes and the like and the material for brake discs because of their excellent flame resistance, flame retardancy, abrasion resistance and corrosion resistance, and because they have drape property and property for spinning that cannot be exhibited by flame resistant inorganic fibers, they are used also as the material of sputter sheets which protect a human body from high-temperature iron powder or welding spark generated in welding operation or the like. Further, such flame resistant fibers have been broadly used as heat insulating material, and as a material to be replaced with asbestos which has been regulated from its harmful affection to human bodies, and their demand is increased.

Further, the above-described flame resistant fibers are important as an intermediate raw material of carbon fibers. Carbon fibers are utilized for various uses because they have various excellent properties such as mechanical properties, light weight property and the like. As the uses of carbon fibers, for example, materials used for space/aero structures such as airplanes and artificial satellites, materials used for sports industrial goods such as golf shafts, fishing rods and tire wheels for bicycles, and materials used for architectural structures such as bridge girder reinforcing members and wind mills, can be exemplified. Furthermore, utilization of carbon fibers is increasing also in transportation and carriage machine uses such as automobiles, ships and trains. Further, because carbon fibers have a high conductivity, application to electronic parts such as chassis for personal computers is beginning. It is considered that in the future demand for carbon fibers will be further increasing, and stable and mass supply thereof is strongly desired.

Carbon fiber can be obtained by spinning and yarn producing a polymer solution prepared by dissolving mainly polyacrylonitrile (hereinafter, also abbreviated as "PAN") in a solvent to induce the polymer into a PAN-based fiber, and burning it at a high temperature in an inert atmosphere. When the PAN-based fiber is employed as a precursor fiber of a carbon fiber, a heat resistant fiber or a flame resistant fiber, it passes through a process of gas-phase stabilization (cyclization reaction and oxidation reaction of PAN) which heats the PAN-based fiber in air at a high temperature such as 200 to 300° C. However, because an exothermic reaction progresses in the stabilization process, heat removal is required when a large amount of PAN-based fibers are stabilized. Therefore, for temperature control, a long-time treatment is required, and it is necessary to restrict the fineness of the PAN-based precursor fiber to a small fineness of a specified value or less to finish the gas-phase stabilization in a desired period of time. Thus, the known stabilization process cannot be said to be a sufficiently efficient process.

With respect to such a problem, in WO 2005/080448, JP-A-2007-31564, WO 2007/018136, JP-A-2008-095257 and JP-A-2009-197358, although shortening of time for the temperature control is succeeded by reacting an amine-based compound and an oxidant and performing liquid-phase stabilization to expedite the stabilization in a liquid, the spinning property (yarn producing property) and the flame resistance are not sufficient. Further, in JP-A-2009-91397, although the spinning property is improved by a metal hydroxide, the flame resistance is still not sufficient and, in addition, the properties when made into carbon fibers tend to be reduced by addition of the metal hydroxide. Furthermore, in JP-A-2009-149712, although an amino-sulfonic acid group is added to improve the spinning property, there is a problem in the flame resistance.

Accordingly, paying attention to the problems in the above-described conventional technologies, it could be helpful to provide a flame resistant PAN-based polymer capable of improving both yarn producing property and flame resistance, a polymer solution using the polymer, a flame resistant fiber using the polymer solution, a carbon fiber using the flame resistant fiber, and methods of producing the same.

SUMMARY

We thus provide:

A flame resistant polymer is obtained by reacting polyacrylonitrile with amine and nitro compounds, the polyacrylonitrile being polymerized by aqueous suspension polymerization using a redox initiator and containing an S component at an amount of 3,000 μg/g or less.

It is preferred that the above-described polyacrylonitrile is polymerized using a persulfate-based oxidant as an oxidant used for combination of the redox initiator at an amount of 0.5 to 6 wt % relative to acrylonitrile.

It is also preferred that the polyacrylonitrile is polymerized using a sulfite-based reductant as a reductant used for combination of the redox initiator at an amount of 0.25 to 3 wt % relative to acrylonitrile.

Further, it is preferred that the polyacrylonitrile has a number average molecular weight Mn of 30,000 or more and 300,000 or less, and a molecular weight distribution (Mw/Mn), which is a ratio of a weight average molecular weight Mw to the number average molecular weight Mn, of 1 or more and 5 or less.

Further, although the content of an S component in the polyacrylonitrile as the used raw material is set at 3,000 μg/g or less as described above, it is preferred that also in the stage of the flame resistant polymer the content of an S component is 3,000 μg/g or less.

A method of producing a flame resistant polymer comprises the steps of:
polymerizing polyacrylonitrile containing an S component at an amount of 3,000 μg/g or less by aqueous suspension polymerization using a redox initiator; and
reacting the polyacrylonitrile with amine and nitro compounds.

A polymer solution contains the above-described flame resistant polymer and an organic solvent.

Further, a method of producing a polymer solution comprises a step of dissolving a flame resistant polymer prepared by the above-described method of producing the polymer in an organic solvent.

A flame resistant fiber is prepared by solution spinning the above-described polymer solution.

Further, a method of producing a flame resistant fiber comprises a step of solution spinning the polymer solution prepared by the above-described method of producing a polymer solution.

A carbon fiber is prepared by carbonizing the above-described flame resistant fiber.

Further, a method of producing a carbon fiber comprises a step of carbonizing the flame resistant fiber prepared by the above-described method of producing a flame resistant fiber.

A flame resistant PAN-based polymer improving both yarn producing property and flame resistance can be realized. Further, a polymer solution using the polymer, which is suitable for spinning, and a method of producing the same, can be provided. Further, a desired flame resistant fiber using the polymer solution and a method of producing the same can be provided. Furthermore, a desired carbon fiber using the flame resistant fiber and a method of producing the same can be provided.

DETAILED DESCRIPTION

Hereinafter, our polymers, solutions, fibers and methods will be explained in detail together with examples.

The flame resistant polymer means a polymer exhibiting a flame resistance (having a flame resistance), and the solution containing the flame resistant polymer means a solution dissolved with a component mainly comprising the flame resistant polymer in an organic solvent. The solution may be a viscous fluid and may exhibit a flowability when formed or molded, and one exhibiting a flowability at a room temperature is, of course, included and, for example, even in case of a solid material or a gel material exhibiting no flowability at a relatively low temperature of 10° C. or lower, all ones exhibiting a flowability around a processing temperature by heating or shear force are included.

The term "flame resistant" has substantially same meaning as "disaster-prevention" and is used including the meaning of "flame retardant." Concretely, "flame resistant" is a generic term indicating a property hard to continue burning, namely, hard to burn. As an example of evaluating the flame resistance of a fiber, there is "Testing methods for flammability of fibers" described in JIS L 1091(1977). Further, in the stage of a flame resistant polymer, since a fairly large dispersion is likely to be included as the property of the flame resistance because the shape and formation of the polymer change depending upon the condition of isolation, it is preferred to employ a method of evaluating it after molding into a definite shape.

The flame resistant polymer has a structure the same as or similar to a structure in a fiber usually called as a flame resistant fiber or a stabilized fiber, which is prepared using a fiber comprising, for example, PAN.

When PAN is used as a precursor, although the structure of a flame resistant polymer is not completely clarified, in the document analyzing the PAN-based flame resistant fiber (Journal of Polymer Science, Part A: Polymer Chemistry Edition, 1986, the 24th volume, p. 3101), we believe that a structure of naphthyridine ring, acridone ring or hydrogenated naphthyridine ring, produced by cyclization reaction or oxidation reaction of a nitrile group, is present, and from the structure, generally it is called as a ladder polymer. Of course, as long as the flame resistance is not damaged, a non-reacted nitrile group may be left, and as long as the solubility is not damaged, a cross linking may occur by a fine amount between molecules.

When 13-C of the flame resistant polymer itself or the solution thereof is determined by a nuclear magnetic resonance (NMR) apparatus, it is preferred to be a structure having a signal in a range of 150 to 200 ppm originating from the polymer. By exhibiting an absorption in the range, there is a tendency that the flame resistance becomes better.

The flame resistant polymer is prepared by modifying PAN with an amine-based compound and oxidizing with a nitro compound.

As a state "modified with an amine-based compound" referred to here, exemplified is a state where an amine-based compound is chemically reacted with PAN as a raw material, or a state where an amine-based compound is incorporated into a polymer by hydrogen bonding or an interaction such as van der Waals force. It is determined by the following method whether a flame resistant polymer is modified with an amine-based compound or not.

A. Method of analyzing a difference in structure with a polymer which is not modified, by spectroscopic manner, for example, using NMR spectrum aforementioned or infrared absorption (IR) spectrum and the like.

B. Method of determining masses of a polymer before and after liquid-phase stabilization by a method described later and confirming whether the mass of a flame resistant polymer is increased relatively to the mass of PAN as a raw material or not.

In the former method A, a section originating from an amine-based compound used as a modifier is added as a new spectrum in a spectrum of a flame resistant polymer modified with the amine-based compound, relatively to a spectrum of a polymer prepared by usual air oxidation (without amine modification).

In the latter method B, usually, although generally in a flame resistant fiber a mass to approximately same extent is obtained relatively to the mass of a PAN-based fiber, it is preferred that a liquid-phase flame resistant polymer is increased in mass by being modified with an amine-based compound, by 1.1 times or more, further, 1.2 times or more, furthermore, 1.3 times or more, relatively to PAN. Further, the upper limit of the increased mass is preferably 3 times or less, more preferably 2.6 times or less, and further preferably 2.2 times or less. If such a change in mass is too small, dissolution of the flame resistant polymer tends to become insufficient and, therefore, when made into a flame resistant molded article or a carbon molded article, there is a possibility that the polymer component becomes a foreign material. On the other hand, if such a change in mass is too great, there is a possibility that the flame resistance of the polymer is damaged.

As an amine-based compound capable of being used for modifying a flame resistant polymer, although any of compounds having primary to quaterary amino group may be employed, concretely, ethylene diamine, diethylene triamine, triethylene tetramine, tetraethylene pentamine, pentaethylene hexamine, N-aminoethyl piperazine and the like can be exemplified.

In particular, it is also preferred to have a functional group having an element of oxygen, nitrogen, sulfur or the like such as hydroxyl group except an amino group, and it is preferably a compound having two or more functional groups including an amino group and such a functional group except the amino group, from the viewpoint of reactivity and the like. Concretely, ethanol amine group such as monoethanol amine, diethanol amine, triethanol amine, N-aminoethyl ethanol amine and the like can be exemplified. Among these, in particular, monoethanol amine is more preferred. These can be used solely or at a combination of two or more kinds. In a compound having a functional group except an amino group, for example, having hydroxyl group, there is a possibility that the hydroxyl group modifies a flame resistant polymer.

The nitro compound is an oxidant, oxidizes PAN, and provide a high flame resistance to PAN. As the nitro compound, concretely, an oxidant of nitro-based, nitroxide-based and the like can be exemplified. Among these, as particularly preferable ones, aromatic nitro compounds such as nitrobenzene, o, m, p-nitrotoluene, nitroxylene, o, m, p-nitrophenol and o, m, p-nitrobenzoic acid can be exemplified. In particular, nitrobenzene having a simple structure is more preferably used. Although the addition amount of the oxidant is not particularly restricted, it is preferably 0.01 to 100 parts by mass, more preferably 1 to 80 parts by mass, further preferably 1 to 60 parts by mass, relatively to PAN of 100 parts by mass. By control at such a compounding ratio, it is facilitated to control the concentration of a solution containing a flame resistant polymer finally prepared in a preferable range aforementioned.

When PAN is served to stabilization under a condition present with an amine-based compound after being dissolved in a polar organic solvent, they may be mixed before addition of PAN and may be simultaneously with addition of PAN. It is preferred that first PAN, an amine-based compound and a polar organic solvent are mixed, and after dissolution by heating, a flame resistant polymer is prepared by adding an oxidant, from the viewpoint of less insoluble substances. Of course, it is not obstructed to mix a component other than PAN, an oxidant, an amine-based compound and a polar organic solvent with such a solution.

Dissolution and stabilization of PAN is expedited by heating such a mixture of PAN, an amine-based compound, a polar organic solvent or the like at an appropriate temperature. At that time, the temperature is preferably 100 to 350° C., more preferably 110 to 300° C., and further preferably 120 to 250° C., although it is different depending upon the used solvent or oxidant. Of course, even when PAN having progressed with stabilization in advance is dissolved, stabilization may be further expedited by heating.

In the solution containing a flame resistant polymer, inorganic particles such as alumina or zeolite, a pigment such as carbon black, an antifoaming agent such as silicone, stabilizer flame retardant such as a phosphorus compound, various kinds of surfactants, and other additives may be contained. Further, for the purpose of improving the solubility of a flame resistant polymer, an inorganic compound such as lithium chloride or calcium chloride can be contained. These may be added before expediting the stabilization, and may be added after expediting the stabilization.

As the method of polymerizing PAN, there are solution polymerization, suspension polymerization and emulsion polymerization.

In a liquid phase stabilization, if PAN as a raw material contains a large amount of impurities, a flame resistant polymer high in flame resistance and yarn producing property cannot be obtained. In this point, to easily prepare PAN which is high-molecular and almost does not contain impurities, it is necessary to employ aqueous suspension polymerization among the polymerization methods of PAN. As an initiator of aqueous suspension polymerization, exemplified are a peroxide such as benzoyl peroxide, an azobis compound such as azobisisobutyronitrile, a redox initiator or the like. We found that, when a redox initiator is used in aqueous suspension polymerization, a flame resistant polymer more excellent in flame resistance and yarn producing property than when using other kinds of polymerization initiators can be obtained. This is supposed because the end of flame resistant polymer has an inorganic end by redox polymerization initiator and this end does not obstruct reaction and is excellent even in thermal resistance as compared with an end produced by other kinds of initiators. Therefore, it is necessary to use a redox initiator as the initiator.

In PAN polymerized by aqueous suspension polymerization, the amount of sulfur (S) component in PAN must be 0 to 3,000 µg/g, and preferably 100 to 2,500 µg/g. If the amount of S component is more than 3,000 µg/g, reactivity with a nitro compound to provide a high flame resistance is remarkably reduced, the flame resistance of a flame resistant polymer obtained becomes low, further, the yarn producing property is also reduced, and it becomes difficult to make the flame resistant polymer into a fiber. The sulfur component in PAN means an S component bonded to PAN, and is not an S component contained in a solvent.

Moreover, from the viewpoint of both yarn producing property and flame resistance, it is preferred that PAN has an absolute number average molecular weight Mn of 30,000 or more and 300,000 or less, and a molecular weight distribution (Mw/Mn), which is a ratio of a weight average molecular weight Mw to the number average molecular weight Mn, of 1 or more and 5 or less. If the absolute number average molecular weight Mn is less than 30,000, the yarn producing property is bad, and the flame resistance also tends to be reduced. If PAN with an absolute number average molecular weight Mn more than 300,000 is used, the viscosity becomes too high, and the reaction becomes hard to be expedited. In this point, if reacted at a concentration lowered, this also becomes hard to be reacted because of the low concentration, and the flame resistance is reduced. The molecular weight distribution and the absolute number average molecular weight Mn are determined from the measurement by a GPC/SEC with a viscosity detector (hereinafter, referred to merely as GPC (Gel Permeation Chromatography)).

Furthermore, among redox initiators, a combination of a persulfate-based initiator and a sulfite-based initiator is preferred. Further preferably, it is a redox initiator combining ammonium persulfate and sodium hydrogen sulfite.

Further, as the combination of a persulfate-based initiator and a sulfite-based initiator, it is preferred to use the persulfate-based initiator at 0.5 to 6 wt % or the sulfite-based initiator at 0.25 to wt % relative to PAN. If less than this amount, reaction is difficult, the molecular weight distribution deteriorates, and the yarn producing property and flame resistance are reduced. If more than this amount, PAN obtained does not become a polymer, and besides, there is a risk that the reaction runs away. Moreover, the sulfur component concentration in PAN becomes high, and the flame resistance is reduced. Further, with respect to the combination of a persulfate-based initiator and a sulfite-based initiator, if a ratio of 1:2 is employed, a polymer can be obtained efficiently.

Since the combination of a persulfate-based initiator and a sulfite-based initiator has a sulfur component, when the sulfur component of polymerized PAN exceeds 3,000 µg/g, cleaning becomes necessary. The cleaning method is, for example, as follows.

(1) PAN prepared by aqueous suspension polymerization is put into a vessel such as a flask, water of ten times or more in mass thereto is poured thereinto, heated at 70° C., and stirred by a stirring blade at 130 rpm for 1 hour.

(2) It is filtered at a filtration pressure of 20 kPa.

(3) Until a time when a change in amount of sulfur component in PAN disappears, (1) and (2) are repeated four times or more.

With the balance of the sulfur component and the absolute molecular weight, from the viewpoint of flame resistance and yarn producing property, it is more preferred that the absolute number average molecular weight Mn of PAN is 50,000 or more and 300,000 or less, and the content of sulfur component is 100 µg/g or more and 2,000 µg/g or less.

PAN may be a homo PAN and may be a copolymerized PAN. With the copolymerized PAN, from the view point of easiness of expediting the stabilization reaction and the solubility, the structural unit originating from acrylonitrile (hereinafter, also referred to as AN) is preferably 85 mol % or more, more preferably 90 mol % or more, and further preferably 92 mol % or more.

As concrete copolymerization components, allyl sulfonic acid metal salt, methallyl sulfonic acid metal salt, acrylic ester, methacrylic ester, acrylic amide and the like can be also copolymerized. Further, except the above-described copolymerization components, as components for accelerating stabilization, components containing a vinyl group, concretely, acrylic acid, methacrylic acid, itaconic acid and the like, can also be copolymerized, and a part or the whole amount thereof may be neutralized with an alkali component such as ammonia.

When PAN is dissolved in a polar organic solvent, as the shape and form of PAN, any of powder, flake and fiber can be employed, and polymer waste, yarn waste and the like generated during polymerization or at the time of spinning also can be used as a recycled raw material. Desirably, it is preferred to be in a form of powder, in particular, microparticles of 100 µm or less, from the viewpoint of solubility into solvent.

Furthermore, in the flame resistant polymer, the contained sulfur component is preferably 0 to 3,000 µg/g, more preferably 50 µg/g to 2,000 µg/g. The contained sulfur component means an S component bonded to the flame resistant polymer and is not an S component contained in a solvent. If the contained sulfur component of the flame resistant polymer exceeds 3,000 µg/g, the yarn producing property also tends to be reduced and, further, when flame resistant fiber made into a fiber is carbonized, defects tend to easily occur.

The flame resistant polymer can be made into a solution whose solvent is an organic solvent (hereinafter, referred to as flame resistant polymer containing solution). With respect to the concentration of the flame resistant polymer containing solution, when the concentration is low, productivity at the time of molding tends to be low although the effects are not damaged, and when the concentration is high, the flowability is poor and it tends to be hard to be molded.

In consideration of being served to spinning, it is preferably 8 to 30 mass %. The concentration of the flame resistant polymer can be determined by the following method.

The flame resistant polymer containing solution is weighed, the solution of about 4 g is put into distilled water of 500 ml, and boiled. A solid material is once taken out, it is again put into distilled water of 500 ml, and boiled. A residual solid component is placed on an aluminum pan, dried for one day by an oven heated at a temperature of 120° C., and a flame resistant polymer is isolated. The isolated solid component is weighed, and the concentration is determined by calculating a ratio with the mass of the original flame resistant polymer containing solution.

Further, the flame resistant polymer tends to be easily made into a solution when employing, in particular, a polar organic solvent as the solvent among organic solvents. This is because the flame resistant polymer modified with an amine-base compound is high in polarity and the polymer is well dissolved by a polar organic solvent.

The polar organic solvent means a solvent having an amino group, an amide group, a sulfonyl group, a sulfone group and the like and further having a good compatibility with water, and as concrete examples, ethylene glycol, diethylene glycol, triethylene glycol, a polyethylene glycol having a molecular weight of about 200 to 1,000, dimethyl sulfoxide (hereinafter, also abbreviated as DMSO), dimethyl formamide, dimethyl acetamide, N-methyl pyrrolidone and the like can be used. These may be used solely, and may be used as a mixture of two or more kinds. In particular, DMSO is preferably employed from the viewpoint that the flame resistant polymer is liable to be coagulated in water and liable to become a dense and hard polymer and therefore the polymer can be applied also to wet spinning.

The viscosity of the flame resistant polymer containing solution can be set in respective preferable ranges depending upon a forming method or a molding method using the polymer, a molding temperature, a kind of a die or a mold and the like. Generally, it can be 1 to 100,000 Pa·s in the measurement at 50° C. More preferably, it is 10 to 10,000 Pa·s, and further preferably, 20 to 1,000 Pa·s. Such a viscosity can be measured by various viscosity measuring devices, for example, a rotary-type viscometer, a rheometer, a B-type viscometer or the like. The viscosity determined by any one method may be controlled in the above-described range. Further, even if out of such a range, by heating or cooling at the time of spinning, it can be used as an appropriate viscosity.

Next, examples of a method of producing a flame resistant polymer containing solution will be explained.

As the method of preparing a flame resistant polymer containing solution, the following methods are exemplified.

A. A method of serving PAN to stabilization in a solution as described above.

B. A method of directly dissolving an isolated flame resistant polymer in a solvent.

In directly dissolving a flame resistant polymer in an organic solvent, dissolution may be performed under an atmospheric pressure, and as the case may be, it may be performed under a pressurized of pressure-reduced condition. As an apparatus used for the dissolution, except a usual reaction vessel with an agitator, a mixer such as an extruder or a kneader can be used solely or at a form of combination thereof.

In this case, the dissolution is preferably performed using an amine-based compound and a polar organic solvent at the sum thereof of 100 to 1,900 parts by mass, preferably 150 to 1,500 parts by mass, relative to 100 parts by mass of an acrylic-based polymer.

Although it is preferred that non-reacted substances, insoluble substances, gel and the like are not contained in the flame resistant polymer containing solution prepared by the above-described method, there is a possibility that they are left at a fine amount. It is preferred to filtrate or disperse non-reacted substances or insoluble substances using a sintered filter or the like before formation into fibers.

Next, a flame resistant fiber using a flame resistant polymer will be explained.

A part of or the whole of a flame resistant fiber is formed by a flame resistant polymer modified with an amine-based compound. Usually, the single fibers of the flame resistant fibers are aggregated to form an aggregate such as a fiber bundle.

In an example of the flame resistant fiber, the coefficient of variation of the cross-sectional areas of the single fibers of the aggregate is controlled preferably at 25% or less, more preferably at 20% or less. By controlling the coefficient of variation of the cross-sectional areas of the single fibers to be small, namely by suppressing the dispersion of the cross-sectional areas of the single fibers to be small, because such flame resistant fibers are improved in stretching property at the carbonization stage and a stretching at a higher draw ratio becomes possible, it becomes possible to obtain carbon fibers having improved properties. The coefficient of variation of the cross-sectional areas of the single fibers can be determined as follows. Namely, the single fibers forming an aggregate are arranged to form a bundle, the whole thereof is embedded with a resin, a cut piece thereof is observed by a microscope and a photograph is taken at a magnification of 1,000 times, the total number of single fibers are sampled in case where the total number thereof is approximately 500, at least 20% of the whole of single fibers are sampled even when the total number thereof is 1,000 or more, the cross-sectional areas of the single fibers are determined, for example, employing image processing, and the coefficient of variation thereof is determined by calculation. The coefficient of variation is defined as standard deviation of population/average value×100.

In the flame resistant fiber, the specific gravity is preferably 1.1 to 1.6, more preferably 1.15 to 1.55, and further preferably 1.2 to 1.5. If the specific gravity is too small, there are many vacancies in a single fiber and there is a possibility that the strength of the fiber is reduced and, on the contrary, if too large, the denseness becomes too high and there is a possibility that the elongation is reduced. Such a specific gravity can be measured utilizing immersion method or sink-float method based on JIS Z 8807(1976).

Such a flame resistant fiber can be obtained through a process of spinning the aforementioned flame resistant polymer containing solution and a process of removing a solvent, as described later.

The flame resistant fiber may be any of a long fiber and a short fiber. In a long fiber, the fibers are suitable to when they are arranged and used as they are as raw materials of carbon fibers or the like, in a short fiber, the fibers are suitable to when they are processed into, for example, crimped yarns and used for a fabric such as a woven fabric, a knitted fabric, a nonwoven fabric or the like.

Further, in forming the fibers as a bundle, although the number of single fibers per one bundle is appropriately decided depending on the purpose of use, from the viewpoint of higher-order processing property, it is preferably 50 to 100,000/bundle, more preferably 100 to 80,000/bundle, and further preferably 200 to 60,000/bundle.

Further, the fineness of each single fiber is preferably 0.00001 to 100 dtex and more preferably 0.01 to 100 dtex in being used as a raw material of a carbon fiber. On the other hand, in being processed into a fabric or the like, it is preferably 0.1 to 100 dtex and more preferably 0.3 to 50 dtex. Further, the diameter of the single fiber preferably is 1 nm to 100 μm and more preferably 10 nm to 50 μm in being used as a raw material of a carbon fiber. On the other hand, in being processed into a fabric, it is preferably 5 to 100 μm and more preferably 7 to 50 μm.

Further, the cross-sectional shape of each single fiber may be a circle, an oval, a cocoon shape and the like, and as the case may be, it may be an undefined shape.

Further, in the flame resistant fiber, the tensile strength of a single fiber is preferably 0.1 to 10 g/dtex, more preferably 0.2 to 9 g/dtex, and further preferably 0.3 to 8 g/dtex. Such a tensile strength can be measured based on JIS L1015 (1981) using a universal tensile tester (for example, Model 1125 supplied by Instron Corporation).

Further, the amount of residual solvent component contained in a flame resistant fiber is preferably 10 mass % or less, more preferably 5 mass % or less, and further preferably 1 mass % or less. If such a rate of residual solvent is too high, there is a possibility that the flame resistance is damaged.

Next, the method for a flame resistant fiber suitable to obtain the flame resistant fiber will be explained.

As the method of spinning the solution containing the flame resistant polymer into a fiber, a wet spinning or a dry/wet spinning is employed to improve the productivity of process.

Concretely, the spinning can be performed by preparing the aforementioned flame resistant polymer containing solution as a raw solution for the spinning, elevating the pressure through a pipe by a booster pump or the like, extruding with metering by a gear pump or the like, and discharging from a die. As the material of the die, SUS, gold, platinum and the like can be appropriately used.

Further, it is preferred that, before the flame resistant polymer containing solution flows into holes of the die, the flame resistant polymer containing solution is filtrated or dispersed using a sintered filter of inorganic fibers or using a woven fabric, a knitted fabric, a nonwoven fabric or the like comprising synthetic fibers such as polyester or polyamide as a filter, from the viewpoint that the fluctuation of the cross-sectional areas of single fibers in a flame resistant fiber aggregate to be obtained can be reduced.

As the hole diameter of the die, an arbitrary one of 0.01 to 0.5 mmφ can be employed, and as the hole length, an arbitrary one of 0.01 to 1 mm can be employed. Further, as the hole arrangement, an arbitrary one such as a staggered arrangement can be employed, and the holes may be divided in advance to realize easy yarn dividing.

Coagulated yarns are obtained by discharging the spinning raw solution from the die directly or indirectly into a coagulation bath. It is preferred that the liquid for the coagulation bath is formed from a solvent used for the spinning raw solution and a coagulation acceleration component, from the viewpoint of convenience, and it is more preferred to use water as the coagulation acceleration component. If a flame resistant polymer insoluble to water is selected, water can be used as the coagulation acceleration component. Although the rate of the solvent for spinning to the coagulation acceleration component in the coagulation bath and the temperature of the liquid for the coagulation bath are appropriately selected and set in consideration of denseness, surface smoothness, spinnability and the like of the coagulated yarns to be obtained, in particular, as the concentration of the coagulation bath, an arbitrary concentration can be employed within a range of solvent/water=0/100 to 95/5, and a range of 30/70 to 70/30 is preferable, and a range of 40/60 to 60/40 is particularly preferable. Further, as the temperature of the coagulation bath, an arbitrary temperature of 0 to 100° C. can be employed. Further, as the coagulation bath, if an alcohol such as propanol or butanol reducing an affinity with water is employed, it can also be used as 100% bath.

In the method of producing the flame resistant fiber, the degree of swelling of the coagulated yarn obtained is controlled to 100 to 1,000 mass %, preferably 200 to 900 mass %, and further preferably 300 to 800 mass %. The degree of swelling of the coagulated yarn controlled in such a range greatly relates to the toughness and easiness in deformation of the coagulated yarn and affects the spinnability. The degree of swelling is decided from the viewpoint of spinnability, and affects a stretching property in bath at a later process and, if in such a range, the coefficient of variation of the cross-sectional areas of single fibers can be made small in the flame resistant fibers to be obtained. The degree of swelling of the coagulated yarn can be controlled by the affinity between the flame resistant polymer forming the coagulated yarn and the coagulation bath and the temperature or the concentration of the coagulation bath, and a degree of swelling in the above-described range can be achieved by controlling the temperature of the coagulation bath or the concentration of the coagulation bath in the aforementioned range relatively to a specified flame resistant polymer.

Next, it is preferred that the coagulated yarn is stretched in a stretching bath or washed in a water washing bath. Of course, it may be stretched in a stretching bath as well as washed in a water washing bath. The draw ratio for the stretching is preferably 1.05 to 5 times, more preferably 1.1 to 3 times, and further preferably 1.15 to 2.5 times. For the stretching bath, hot water or solvent/water is used, and the concentration of solvent/water for the stretching bath can be set at an arbitrary concentration of 0/100 to 70/30. Further, for the water washing bath, usually hot water is used, and the temperature of both the stretching bath and the water washing bath is preferably 50 to 100° C., more preferably 60 to 95° C., and particularly preferably 65 to 85° C.

The fiber completed with coagulation is dried, and as needed, stretched to become a flame resistant fiber.

As the drying method, bringing the fiber into direct contact with a plurality of dried and heated rollers, sending hot air or water vapor, irradiating infrared rays or electromagnetic rays with a high frequency, making a pressure reduced condition or the like can be appropriately selected and combined. Usually, in sending hot air, it can be performed at a parallel flow or crossflow relative to the running direction of the fiber. For the infrared rays of radiation-heating type, far infrared rays, mid infrared rays or near infrared rays can be employed, and radiation of microwaves can also be employed. Although the temperature for the drying can be employed arbitrarily in a range of approximately 50 to 450° C., generally, the drying takes a long time in case of a low temperature and a short time in case of a high temperature.

When stretching is carried out after drying, the specific gravity of the fiber after drying is usually 1.15 to 1.5, preferably 1.2 to 1.4, and more preferably 1.2 to 1.35. The coefficient of variation of the cross-sectional areas of single fibers in the fiber aggregate after drying is preferably 5 to 30%, more preferably 7 to 28%, and further preferably 10 to 25%. Further, the elongation of the single fiber in the fiber aggregate after drying is preferably 0.5 to 20%. Furthermore, in the fiber aggregate after drying, oxidation calorific value (J/g) determined by differential scanning calorimetry (DSC) is preferably 50 to 4,000 J/g. As the case may be, not a continuous drying but a batch drying can be carried out.

For such a stretching process, it is preferred to use a method of heating the fiber at a condition of containing water in the fiber such as a bath stretching using warm water or hot water, a stretching using steam (water vapor), or a heat stretching by a dryer or rolls after providing water to the fiber in advance, and heating/stretching by steam stretching is particularly preferred. This is based on a discovery that the flame resistant polymer modified with amine, used for production of the flame resistant polymer, is remarkably plasticized by water.

In using a bath stretching, it is preferred that the stretching is carried out at a temperature of, preferably 70° C. or higher, more preferably 80° C. or higher, and further preferably 90° C. or higher. At this stage, the fiber structure is already densified, even if the temperature is elevated, there is no fear of generating micro voids, and a stretching at a temperature as high as possible is preferred because a high effect due to molecular orientation can be obtained. Although it is preferred to use water for the bath, the stretching property may be further enhanced by adding a solvent or other additives.

Although a higher stretching temperature is preferred, in a bath stretching, basically 100° C. becomes the upper limit. Accordingly, a stretching using steam is employed more preferably. Although the temperature for the stretching is preferred to be higher, when a saturated vapor is used, because the internal pressure of the apparatus is high, there is a possibility that the fiber is damaged by blow of the vapor. For the purpose of obtaining a flame resistant fiber with a degree of orientation of 65% or more, a saturated vapor with a temperature of 100° C. or higher and 150° C. or lower may be used. If the temperature exceeds 150° C., the effect due to plasticization gradually gets to the top, and damage to the fiber due to the blow of vapor becomes greater than the effect due to the plasticization. As the stretching treatment apparatus using a saturated vapor, an apparatus devising to pressurize the inside of the treatment apparatus by providing a plurality of apertures at the fiber inlet and outlet is preferably used.

It is also possible to use a super-heated atmospheric high-temperature steam to prevent the damage of the fiber due to the blow of vapor. This becomes possible by heating an atmospheric steam using electric heating, water vapor heating, induction heating and the like and, thereafter, introducing it into the stretching treatment apparatus. Although it is possible to employ a range of 100° C. or higher and 170° C. or lower for the temperature, it is preferred to be 110° C. or higher and 150° C. or lower. If the temperature is too high, the moisture contained in the steam is reduced, and the effect of plasticizing the fiber becomes hard to be obtained.

The draw ratio for the bath stretching and the draw ratio for the stretching by steam are preferably 1.5 times or more, and more preferably 2.0 times or more. To promote the molecular orientation, the draw ratio for the stretching is preferred to be higher, and an upper limit thereof is not particularly present. However, from restriction on stability for yarn production, it is frequently difficult to exceed about 6 times.

Further, in the method of stretching the fiber, the means thereof is not restricted to the bath stretching or the steam stretching. For example, heat stretching by a drying furnace or a hot roller or the like after providing moisture may be possible.

A non-contact type stretching machine using a drying furnace, further, a contact type stretching machine using a contact plate, a hot roller or the like, can also be used. However, in a contact type stretching machine, evaporation of moisture is fast and, further, there is a high possibility that a fiber is mechanically scratched at a point occurred with stretching. Further, in a non-contact type stretching machine, a required temperature becomes 250° C. or higher, and as the case may be, thermal decomposition of the polymer starts. Furthermore, when a non-contact type stretching machine or a contact type stretching machine is used, the effect due to stretching is low, and it is more difficult to obtain a flame resistant fiber with a high orientation than the stretching method using moisture. From these reasons, it is more preferred to use a bath stretching or a steam stretching.

The stretched yarn thus stretched is preferably dried again, as needed. The moisture percentage of the fiber is preferably 10% or less, and more preferably 5% or less. As this drying method, although bringing the fiber into direct contact with a plurality of dried and heated rollers or hot plates, sending hot air or water vapor, irradiating infrared rays or electromagnetic rays with a high frequency, making a pressure reduced condition can be appropriately selected and combined, it is preferred to employ drying due to rollers to perform an efficient drying. The number of the rollers is not restricted. The temperature of the rollers is preferably 100° C. or higher and 300° C. or lower, and more preferably 150° C. or higher and 200° C. or lower. If the drying at this process is insufficient, there is a possibility to cause a fiber breakage when a tension is applied to the fiber at a heat treatment process carried out later.

The stretched yarn having been dried is preferably served further to heat treatment process as needed. The flame resistant polymer is few in crosslinking between molecules, and if the fiber prepared only by forming this into a fiber, drying and stretching is used, depending upon conditions, there is a possibility to cause an orientation relaxation when a final product is exposed to a high temperature or a chemical. It is preferred to provide a crosslinking due to chemical bonding after the stretching process to prevent this. The method for this heat treatment is not particularly restricted, and methods of bringing the fiber into direct contact with a plurality of heated rollers or hot plates, sending hot air or water vapor, irradiating infrared rays or electromagnetic rays with a high frequency, making a pressure reduced condition can be appropriately selected and combined. In particular, it is preferred to use a drying apparatus to control chemical reaction and suppress unevenness in fiber structure. The temperature and the treatment length are appropriately selected depending upon the oxidation degree of the used flame resistant polymer, the fiber orientation degree and the required properties for a final product. Concretely, the treatment temperature is preferably 200° C. or higher and 400° C. or lower. Although a short treatment time is preferable because the productivity is high, if the temperature is elevated therefor, because a difference in structure in the cross section of the fiber is liable to occur, it is adjusted depending on the required properties for a product. Concretely, the treatment time can employ an arbitrary value of 0.01 to 60 minutes. Further, it is preferred to perform a stretching when the heat treatment is carried out. By carrying out the stretching treatment, the molecular orientation can be further enhanced. The draw ratio for this stretching is preferably 1.05 to 4 times. The draw ratio is set from required strength and fineness of the flame resistant fiber, process passing-through property and the temperature of the heat treatment.

It is preferred that the fiber thus obtained is not burned even if flame is contacted, and the LOI (Lowest Oxygen Index) thereof is preferably 40 or more. Moreover, the flame resistant fiber has a high orientation and a high density, and is high in mechanical properties, and high in environmental tolerance against chemical, heat and the like. In stretching after drying, the stretching temperature is 200 to 400° C., preferably 200 to 350° C., and the draw ratio for the stretching is 1.1 to 4 times, preferably 1.2 to 3 times, and more preferably 1.3 to 2.5 times. The draw ratio for the stretching is set from the required strength and fineness of the flame resistant fiber. Further, it is also important to perform heat treatment at the time of stretching, and as the time for the heat treatment, an arbitrary value of 0.01 to 15 minutes can be employed depending upon the temperature. The stretching and the heat treatment may be performed either simultaneously or separately.

In the method of producing a flame resistant fiber, even if the degree of swelling of the coagulated yarn obtained is not controlled in the aforementioned specified range, in case of stretching after drying, by performing the drying at 50 to 300° C. and the stretching at 200 to 350° C. separately as processes different from each other, the aforementioned flame resistant fiber can be prepared.

To the coagulate yarn, or the fiber at a water swelling state after being stretched, an oil component can be appropriately provided depending upon the necessity of a higher-order processing. When an oil component is provided, usually the concentration of the oil is set at 0.01 to 20 mass %. As the method of providing, although it may be appropriately selected and employed in consideration of being provided uniformly up to the interior of the yarn, concretely, a method such as dipping of the yarn into an oil bath or spray or dropping onto the running yarn is employed. The oil comprises, for example, a main oil component such as silicone and a diluent component to dilute it. The concentration of oil means a content of the main oil component relative to the whole of the oil. The kind of the oil component is not particularly restricted, silicone, amino-modified silicone, epoxy-modified silicone or polyether-modified silicone can be provided solely or at a mixture thereof, and other oil components may be provided.

The adhesion amount of such an oil component is determined as a rate relative to the dried mass of the fiber included with the oil component, and it is preferably 0.05 to 5 mass %, more preferably 0.1 to 3 mass %, and further preferably 0.1 to 2 mass %. If the adhesion amount of an oil component is too little, there is a possibility that fusion of single fibers to each other occurs and the tensile strength of an obtained carbon fiber is reduced and, if too much, there is a possibility that it becomes difficult to obtain the desired effect.

When the flame resistant fibers are formed into a bundle formed with a plurality of single fibers, although the number of single fibers included in a single bundle can be appropriately selected depending upon the purpose of use, to control the aforementioned preferred number, it can be adjusted by the number of holes of a die, and a plurality of flame resistant fibers may be doubled.

Further, to control the fineness of the single fiber in the aforementioned preferable range, it can be controlled by selecting the hole diameter of a die or appropriately deciding the discharge amount from a die.

Further, when the fineness of a single fiber is made greater, making the time for drying longer, or elevating the temperature for drying higher, is preferred from the viewpoint of reduction of the amount of residual solvent. When it is required to obtain a fibrous flame resistant molded article having a smaller fineness of a single fiber, it is preferred to use electronic spinning or the like. By such a method, a fineness of nanofiber level having a diameter of preferably 100 nm or less, more preferably 1 to 100 nm, further preferably 5 to 50 nm, can also be realized.

Further, the cross-sectional shape of a single fiber can be controlled by the shape of a discharge hole of a die such as a circular hole, an oval hole or a slit and the condition at the time of removing a solvent.

A carbon fiber can be obtained by heat treating the flame resistant fiber at a high temperature in an inert atmosphere, so-called carbonizing. As a concrete method of obtaining a carbon fiber, can be exemplified a method of treating the above-described flame resistant fiber at a highest temperature in an inert atmosphere of 300° C. or higher and lower than 2,000° C. More preferably, as the lower side of the highest temperature, 800° C. or higher, 1,000° C. or higher and 1,200° C. or higher are preferred in order, and as the upper side of the highest temperature, 1,800° C. or lower can also be employed. Further, by further heating such a carbon fiber in an inert atmosphere at a temperature of 2,000 to 3,000° C., a carbon fiber developing in graphite structure can also be obtained.

In such a carbon fiber, as the lower side of the tensile strength, 100 MPa or more, 200 MPa or more, and 300 MPa or more are preferred, and more concretely, it is good to be preferably 1,000 MPa or more, more preferably 2,000 MPa or more, and further preferably 3,000 MPa or more.

Further, as the upper side of the tensile strength, 10,000 MPa or less, 8,000 MPa or less and 6,000 MPa or less are adequate in order. If the tensile strength is too low, there is a possibility of being not able to be used as a reinforcing fiber. Although it is preferred that the tensile strength is as high as possible, 1,000 MPa is frequently sufficient.

Further, in such a carbon fiber, it is good that the diameter of the single fiber is 1 nm to $7 \times 10^4$ nm, preferably 10 nm to $5 \times 10^4$ nm, and more preferably 50 nm to $10^4$ nm. If such a diameter of the single fiber is less than 1 nm, there is a possibility that the fiber is liable to be broken, and if more than $7 \times 10^4$ nm, a defect rather tends to be caused. The single fiber of the carbon fiber may be one having a hollow portion. In this case, the hollow portion may be either continuous or discontinuous.

From the viewpoint of reducing cost, it is preferred to produce a carbon fiber by one process from a flame resistant polymer to the carbon fiber.

EXAMPLES

Next, our polymers, solutions, fibers and methods will be explained more concretely by Examples. The respective properties and characteristics in the Examples were determined by the following methods.
Polymerization of PAN Various kinds of PANs were polymerized with the compositions described in Table 1, and washed.
Method of Polymerizing PANs (a)-(g) and (i):

A thermometer, a cooler, an agitator and a nitrogen introducing tube were attached to a three neck flask having a sufficient capacity, and thereinto, a concentrated sulfuric acid and a distilled water of an amount of 90% of the amount described in Table 1 were put at the rate described in Table 1. Then, air was removed by blowing in nitrogen, after 20 minutes, the flask was heated to the interior temperature described in Table 1, and AN was added while stirring. Further, after 10 minutes, ammonium persulfate was added at a condition being dissolved in a distilled water of an amount of 5% of the amount described in Table 1. Next, sodium hydrogen sulfite was gradually added as an aqueous solution prepared at a condition being dissolved in a distilled water of an amount of 5% of the amount described in Table 1. After stirring for 5 hours at the temperature described in Table 1, the interior temperature of the flask was returned to a room temperature, and the precipitate of the produced P was filtrated by suction and washed.
Method of Preparing PAN solution (h):

Acrylonitrile of 100 parts by weight, DMSO of 371 parts by weight, azobisisobutyronitrile of 0.4 part by weight and octylmercaptan of 1 part by weight were charged into the reaction vessel, were polymerized by heating at 65° C. for 5 hours and at 75° C. for 7 hours after replacement with nitrogen to prepare a solution containing PAN polymerized with 100 mol % of acrylonitrile using DMSO as the solvent. The whole of the system was evacuated by a pump to reduce down to 30 hPa, thereby removing monomer.
Washing of PAN The washing of PAN was carried out as follows:
(1) PAN is put in a vessel such as a flask, water of a mass 10 times or more thereof is poured thereinto, it is heated at 70° C., and stirred at 130 rpm for one hour by a stirring blade.
(2) It is filtrated at a filtration pressure of 20 kPa.
(3) (1) and (2) are repeated 4 times.
(4) It is filtrated at a pressurized condition with methanol.
Drying of PAN The above-described PAN obtained was put into a pressure reduced drier, the degree of reduced pressure was controlled at 0.2 kPa, the drying was continued at 60° C. for 5 days.
Determination of Absolute Molecular Weight by GPC It was dissolved in N-methyl pyrrolidone (added with 0.01N-lithium bromide) so that the concentration of flame resistant polymer to be determined became 2 mg/mL to prepare a specimen solution. A distribution curve of the absolute molecular weight was determined from the GPC curve measured at the following conditions using a GPC apparatus, and Mz, Mw and a number average molecular weight Mn were calculated. The measurement was carried out at n=1.
GPC apparatus: PROMINAICE (supplied by Shimadzu Corporation)
Column: polar organic solvent-system GPC column TSK-GEL-α-M (x2) (supplied by Tosoh Corporation)
Detector: (viscosity detection and R1 detection system)
Viscotek Model 305TDA Detectors (Supplied by Malvern Corporation)
Flow rate: 0.6 mL/min.
Temperature: 40° C.
Filtration of sample: membrane filter (0.45 μm cut)
Amount of injection: 100 μL
Determination of Sulfur Component Due to Combustion Ion Chromatography The quantitative analysis of total sulfur in PAN and flame resistant polymer was carried out by the following method.

Sulfuric ion standard solution (1,003 μg/mL, supplied by Wako Pure Chemical Industries, Ltd.) was diluted in order with a separately prepared phosphoric acid internal standard solution to prepare standard solutions. Among these, using an analysis data of a standard solution adequate for analysis of the concentration in the sample, a calibration curve was made.

Powder of dried PAN was weighed as it was, it was burned in a combustion tube of the following analyzer, and after the generated gas was absorbed in a solution, a part of the absorbing solution was analyzed by ion chromatography. The samples were measured at n=2 from the weighing, and an average of the measured values was determined.
The conditions of the combustion and absorption are as follows:
System: AQF-100, GA-100 (supplied by Mitsubishi Chemical Corporation)
Temperature of electric furnace: Inlet; 900° C., Outlet; 1,000° C.
Gas: Ar/$O_2$; 200 mL/min., $O_2$; 400 mL/min
Absorbing solution: $H_2O_2$; 90 μg/mL, internal standard solution P; 1 μg/mL
Amount of absorbing solution: 10 mL Ion chromatography, anion analyzing conditions are as follows:

System: ICS 1,500 (supplied by DIONEX Corporation)
Mobile phase: 2.7 mmol/L $Na_2CO_3$/0.3 mmol/L $NaHCO_3$
Flow rate: 1.5 mL/min.
Detector: conductivity detector
Amount of injection: 100 µL Liquid Phase Stabilization Reaction A thermometer, a cooler, a stirring blade and a nitrogen introducing tube were attached to a three neck flask having a sufficient capacity. In this flask, PAN was dissolved in DMSO, an amine-based compound and a nitro compound were added, and while being stirred at 300 rpm by the stirring blade, the reaction was performed by being heated in an oil bath at 150° C. for 6 hours.

Isolation of Flame Resistant Polymer

The obtained flame resistant polymer containing solution was washed by ethanol or hot water, and the precipitate was dried to obtain a flame resistant polymer.

Spinning

The flame resistant polymer solution obtained by the liquid phase stabilization reaction was served to a wet spinning apparatus as it was, thereby forming fibers.

Evaluation of Yarn Producing Property

When a single fiber breakage at a die did not happen for two or more hours during the above-described spinning, it was determined that the yarn producing property was very good and determined to be Rank A, when it did not happen for 1 hour to 2 hours, it was determined that the yarn producing property was good and determined to be Rank B, when yarn producing was sufficiently possible and the yarn breakage did not happen for 15 minutes to 1 hour, it was determined that yarn producing was possible and to be Rank C, and when it happened within 15 minutes, it was determined that yarn producing was difficult and to be Rank D.

Count of Fluffs

A bobbin of a flame resistant fiber bundle, which was a sample for evaluation, was left for 30 minutes or more in a temperature controlled room managed at a temperature of 23±5° C. and a relative humidity of 60±20%. Next, using a fluff measuring apparatus provided in the temperature controlled room set at the above-described temperature and humidity conditions, the number of fluffs was measured. Namely, the flame resistant fiber bundle was set to a creel incorporated with a powder clutch, and a yarn path was formed. After the flame resistant fiber bundle was wound 5 times or more onto a drive roller for forming a yarn path not to cause a slipping at the time of running, it was wound up by a winder. Setting the yarn speed at 50 m/min., the running of the flame resistant fiber bundle was started at the yarn path through the drive roller and a carrier roller. After confirming that the yarn path became stable, the initial tension was adjusted by the above-described powder clutch so that the tension of the flame resistant fiber at the time of running measured between a fluff counter and the drive roller became 6 gf/tex. Thereafter, operating the fluff counter, the measurement of the number of fluffs at the condition of running for 300 minutes was repeated 3 times for each sample.

The used fluff counter is one which irradiates a light from a lamp to the running yarn, and at a condition condensing the radiated light by a lens, detects the number of fluffs by a photo transistor. As the detection accuracy, it is possible to detect a fluff having a yarn length of 2 mm or more and a single fiber diameter of single fibers forming the flame resistant fiber bundle.

Evaluation of Flame Resistance

Forming a sample having a length of 15 cm with 400 filaments, based on JIS L 1091(1977), the whole of the fibers were roasted for 5 seconds by a flame of an ignition device "Chakkaman" (registered trade mark). The mass of the remaining burn was determined, and the shape of the remaining burn was observed.

When the mass of the remaining burn was more than 50% and the shape of the remaining burn was maintained as a fibrous shape was determined to be good in flame resistance. When the mass of the remaining burn was in a range of 35 to 50% and the shape of the remaining burn was maintained as a fibrous shape was determined to be sufficient in flame resistance. When the mass of the remaining burn was less than 35% and the shape of the remaining burn could not be maintained as a fibrous shape and the shape was in a condition collapsing was determined to be not good in flame resistance. The number of the measurements was set at n=5, and the state most frequently appeared was evaluated as the flame resistance of the sample. When the evaluation could not be decided, a further evaluation of n=5 was added, and the measurement was repeated until the evaluation could be decided. In Tables 2 and 3 described later, the flame resistance is shown by the percentage of the mass of the remaining burn.

Example 1

PAN (a) of 15 parts by weight, orthonitrophenol of 2.0 parts by weight as nitro compound, N-aminoethyl ethanol amine of 1 part by weight and monoethanol amine of 1 part by weight as amine-based compound, and DMSO of 81 parts by weight as polar solvent, were put into a flask, and while stirring at 300 rpm by a stirring blade, they were heated in an oil bath at 150° C. for 6 hours to be reacted to prepare a flame resistant polymer containing solution. The ratio of PAN: nitro compound: amine-based compound is 15:2:2. The concentration of S component of the obtained flame resistant polymer was 1,400 µg/g.

As the result of spinning, the yarn producing property was determined to be A, the number of fluffs was determined to be 54, the result of the flame resistance test of the obtained fiber was 40%, the flame resistance was sufficient, and it was a good result. The concentration of S component of the obtained flame resistant polymer was 1,400 µg/g.

Example 2

The examination was carried out in a manner similar to that in Example 1 other than a condition where methanitrophenol of 2.0 parts by weight was used as nitro compound. The ratio of PAN: nitro compound: amine-based compound is 15:2:2. The concentration of S component of the obtained flame resistant polymer was 1,400 µg/g.

As the result of spinning, the yarn producing property was determined to be A, the number of fluffs was determined to be 50, the result of the flame resistance test of the obtained fiber was 41%, the flame resistance was sufficient, and it was an approximately same result as that of Example 1.

Example 3

The examination was carried out in a manner similar to that in Example 1 other than a condition where orthonitrotoluene of 2.0 parts by weight was used as nitro compound. The ratio of PAN: nitro compound: amine-based compound is 15:2:2. The concentration of S component of the obtained flame resistant polymer was 1,400 µg/g.

As the result of spinning, the yarn producing property was determined to be A, the number of fluffs was determined to be 59, the result of the flame resistance test of the obtained fiber was 39%, the flame resistance was sufficient, and it was an approximately same result as that of Example 1.

Example 4

The examination was carried out in a manner similar to that in Example 1 other than a condition where orthonitrobenzene of 2.0 parts by weight was used as nitro compound. The ratio of PAN: nitro compound: amine-based compound is 15:2:2. The concentration of S component of the obtained flame resistant polymer was 1,500 µg/g.

As the result of spinning, the yarn producing property was determined to be A, the number of fluffs was determined to be 55, the result of the flame resistance test of the obtained fiber was 42%, the flame resistance was sufficient, and it was an approximately same result as that of Example 1.

Example 5

The examination was carried out in a manner similar to that in Example 1 other than conditions where N-aminoethyl ethanol amine of 1 part by weight and monoethanol amine of 2 parts by weight as amine-based compound, and DMSO of 80 parts, were used. The concentration of S component of the obtained flame resistant polymer was 1,400 µg/g.

As the result of spinning, the yarn producing property was determined to be A, the number of fluffs was determined to be 67, the result of the flame resistance test of the obtained fiber was 39%, the flame resistance was sufficient, and it was an approximately same result as that of Example 1.

Example 6

The examination was carried out in a manner similar to that in Example 1 other than conditions where PAN (a) of 8 parts by weight, nitrobenzene of 1.1 parts by weight as nitro compound, N-aminoethyl ethanol amine of 0.5 part by weight and monoethanol amine of 0.5 part by weight as amine-based compound, and DMSO of 90 parts by weight as polar solvent, were used. The concentration of S component of the obtained flame resistant polymer was 1,400µg/g.

Although the concentration of polymer was lowered to be 8 wt %, as the result of spinning, the yarn producing property was determined to be A, the number of fluffs of the obtained fiber was 40, the result of the flame resistance test thereof was 38%, the flame resistance was sufficient, and it was an approximately same result as that of Example 1.

Example 7

The examination was carried out in a manner similar to that in Example 4 other than a condition where PAN (b) of 15 parts by weight was used. The ratio of PAN: nitro compound: amine-based compound is 15:2:2. The concentration of S component of the obtained flame resistant polymer was 700 µg/g.

As the result of spinning, the yarn producing property was determined to be A, the number of fluffs of the obtained fiber was 51, the result of the flame resistance test thereof was 44%, and the flame resistance was sufficient. As compared to Example 4, because the sulfur component in PAN was reduced down to 800 µg/g, the yarn producing property, the number of fluffs and the flame resistance were improved.

Example 8

The examination was carried out in a manner similar to that in Example 4 other than a condition where PAN (c) of 15 parts by weight was used. The ratio of PAN: nitro compound: amine-based compound is 15:2:2. The concentration of S component of the obtained flame resistant polymer was 150 µg/g.

Because the sulfur component in PAN was reduced down to 200 µg/g, the yarn producing property was determined to be A, the number of fluffs of the obtained fiber was 50, the result of the flame resistance test thereof was 46%, and the flame resistance was sufficient. The yarn producing property, the number of fluffs and the flame resistance were improved more than Example 4.

Example 9

The examination was carried out in a manner similar to that in Example 4 other than a condition where PAN (d) of 13 parts by weight was used. The ratio of PAN: nitro compound: amine-based compound is 15:2:2. The concentration of S component of the obtained flame resistant polymer was 200 µg/g.

Because the sulfur component in PAN was reduced down to 300 µg/g and the molecular weight was increased, as compared to Example 4, the yarn producing property became A, the number of fluffs of the obtained fiber was reduced down to 32, the result of the flame resistance test was 52%, and the flame resistance was good. The yarn producing property, the number of fluffs and the flame resistance were improved more than Example 4.

Example 10

The examination was carried out in a manner similar to that in Example 4 other than a condition where PAN (e) of 10 parts by weight was used. The ratio of PAN: nitro compound: amine-based compound is 15:2:2. The concentration of S component of the obtained flame resistant polymer was 150µg/g.

As the result of spinning, the yarn producing property was determined to be A, and the number of fluffs of the obtained fiber was 49. Because the sulfur component in PAN was very fine to be 110 µg/g, the result of the flame resistance test of the fiber was improved up to 54%, and the flame resistance was good. The yarn producing property, the number of fluffs and the flame resistance were improved more than Example 4.

Example 11

The examination was carried out in a manner similar to that in Example 4 other than a condition where PAN (f) of 15 parts by weight was used. The ratio of PAN: nitro compound: amine-based compound is 15:2:2. The concentration of S component of the obtained flame resistant polymer was 2,500 µg/g.

Because the sulfur component in PAN was increased up to 2,800 µg/g, as the result of spinning, the yarn producing property was determined to be B, the number of fluffs of the obtained fiber became 81, the result of the flame resistance test thereof became 36%, and the flame resistance was sufficient. The yarn producing property, the number of fluffs and the flame resistance were poorer than Example 4.

Example 12

The examination was carried out in a manner similar to that in Example 4 other than a condition where PAN (g) of 8 parts by weight was used. The ratio of PAN: nitro compound: amine-based compound is 15:2:2. The concentration of S component of the obtained flame resistant polymer was 20 μg/g.

As the result of spinning, the yarn producing property was determined to be B, the number of fluffs of the obtained fiber was 121, the result of the flame resistance test thereof was 51%, and the flame resistance was good. Because of the great molecular weight, the polymer concentration could be increased only to 8 wt % and, resultantly, in addition that the yarn producing property was reduced, the viscosity was high and the reaction was not progressed uniformly, and the flame resistance was also reduced as compared with Examples 1-10.

Comparative Example 1

The examination was carried out in a manner similar to that in Example 1 other than a condition where PAN solution (h) of 15 parts by weight was used. The ratio of PAN: nitro compound: amine-based compound is 15:2:2. The concentration of S component of the obtained flame resistant polymer was 1,800 μg/g.

Although the sulfur component in PAN was 1,000 μg/g, because the PAN solution which was solution polymerized was used as it was, the yarn producing property was C, the number of fluffs of the obtained fiber was 178, the result of the flame resistance test thereof was 23%, they were not good, and the yarn producing property, the number of fluffs and the flame resistance were reduced as compared to Example 1.

Comparative Example 2

The examination was carried out in a manner similar to that in Example 2 other than a condition where PAN (i) of 15 parts by weight was used. The ratio of PAN: nitro compound: amine-based compound is 15:2:2. The concentration of S component of the obtained flame resistant polymer was 3,300 μg/g.

Because the sulfur component in PAN was increased up to 3,500 μg/g, the yarn producing property was reduced down to D, the number of fluffs of the obtained fiber was 172, the result of the flame resistance test thereof was 29%, they were not good, and the results became approximately same as those of Comparative Example 1.

Comparative Example 3

The examination was carried out in a manner similar to that in Example 3 other than a condition where PAN (i) of 15 parts by weight was used. The ratio of PAN: nitro compound: amine-based compound is 15:2:2. The concentration of S component of the obtained flame resistant polymer was 3,300 μg/g.

Because the sulfur component in PAN was increased up to 3,500 μg/g, as compared with Example 3, the yarn producing property was reduced down to D, the number of fluffs of the obtained fiber was 190, the result of the flame resistance test thereof was 27%, and they were not good.

Comparative Example 4

The examination was carried out in a manner similar to that in Example 4 other than a condition where PAN (i) of 15 parts by weight was used. The ratio of PAN: nitro compound: amine-based compound is 15:2:2. The concentration of S component of the obtained flame resistant polymer was 3,300 μg/g.

Because the sulfur component in PAN was increased up to 3,500 μg/g, the yarn producing property was reduced down to D, the number of fluffs of the obtained fiber was 181, the result of the flame resistance test thereof was 28%, and they were not good.

Comparative Example 5

The examination was carried out in a manner similar to that in Example 5 other than a condition where PAN (i) of 15 parts by weight was used. The ratio of PAN: nitro compound: amine-based compound is 15:2:2. The concentration of S component of the obtained flame resistant polymer was 3,200 μg/g.

Because the sulfur component in PAN was increased up to 3,500 μg/g, as compared with Example 5, the yarn producing property was reduced down to D, the number of fluffs of the obtained fiber was 178, the result of the flame resistance test thereof was 28%, and they were not good.

Comparative Example 6

The examination was carried out in a manner similar to that in Example 6 other than a condition where PAN (i) of 15 parts by weight was used. The ratio of PAN: nitro compound: amine-based compound is 15:2:2. The concentration of S component of the obtained flame resistant polymer was 3,300 μg/g.

Because the sulfur component in PAN was increased up to 3,500 μg/g, as compared with Example 6, the yarn producing property was reduced down to D, the number of fluffs of the obtained fiber was 191, the result of the flame resistance test thereof was 27%, and they were not good.

TABLE 1

| | | | Polyacrylonitrile | | | | | | | | |
|---|---|---|---|---|---|---|---|---|---|---|---|
| | | | a | b | c | d | e | f | g | h | i |
| Monomer | acrylonitrile | part by weight | 8.7 | 8.7 | 8.7 | 8.7 | 8.7 | 8.7 | 8.7 | 100 | 8.7 |
| Initiator | 2,2'-azobisisobutyronitrile | | | | | | | | | 0.40 | |
| | ammonium persulfate | | 0.28 | 0.28 | 0.10 | 0.084 | 0.084 | 0.40 | 0.020 | | 0.400 |
| | sodium hydrogen sulfite | | 0.120 | 0.120 | 0.050 | 0.036 | 0.036 | 0.200 | 0.010 | | 0.200 |

TABLE 1-continued

| | | | Polyacrylonitrile | | | | | | | | |
|---|---|---|---|---|---|---|---|---|---|---|---|
| | | | a | b | c | d | e | f | g | h | i |
| Additive | sulfuric acid (98%) aqueous solution | | 0.0048 | 0.0048 | 0.0048 | 0.0048 | 0.0048 | 0.0048 | 0.0048 | | 0.0048 |
| | octylmercaptan | | | | | | | | | 1 | |
| Solvent | DMSO | | | | | | | | | 375 | |
| | dimethyl sulfoxide | | 90.9 | 90.9 | 90.9 | 91.2 | 91.2 | 90.9 | 91.3 | | 90.7 |
| | reaction temperature | °C. | 41 | 44 | 50 | 44 | 42 | 42 | 45 | 75 | 45 |
| Property of each polyacrylonitrile | concentration of S component | µg/g | 1600 | 800 | 200 | 300 | 200 | 2800 | 40 | 1800 | 3500 |
| | number average molecular weight Mn | | 64000 | 54000 | 75000 | 160000 | 200000 | 50000 | 310000 | 200000 | 45000 |
| | molecular weight distribution Mw/Mn | | 3.0 | 4.0 | 4.0 | 2.0 | 4.0 | 4.2 | 4.0 | 3 | 4.0 |
| | ammonium persulfate/ acrylonitrile × 100 | wt % | 3.2 | 3.2 | 1.1 | 1.0 | 1.0 | 4.6 | 0.2 | — | 4.6 |
| | sodium hydrogen sulfite/ acrylonitrile × 100 | wt % | 1.4 | 1.4 | 0.6 | 0.4 | 0.4 | 2.3 | 0.1 | — | 2.3 |

TABLE 2

| | | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|
| Polyacrylonitrile | PAN(a) | part by weight | 15 | 15 | 15 | 15 | 15 | 10 | | | | | | |
| | PAN(b) | | | | | | | | 15 | | | | | |
| | PAN(c) | | | | | | | | | 15 | | | | |
| | PAN(d) | | | | | | | | | | 13 | | | |
| | PAN(e) | | | | | | | | | | | 12 | | |
| | PAN(f) | | | | | | | | | | | | 15 | |
| | PAN(g) | | | | | | | | | | | | | 8 |
| Nitro compound | orthonitrophenol | | 2.0 | | | | | | | | | | | |
| | methanitrophenol | | | 2.0 | | | | | | | | | | |
| | orthonitrotoluene | | | | 2.0 | | | | | | | | | |
| | nitrobenzene | | | | | 2.0 | 2.0 | 1.3 | 2.0 | 2.0 | 1.7 | 1.6 | 2.0 | 1.1 |
| Amine | N-aminoethyl ethanol amine | | 1 | 1 | 1 | 1 | 1 | 0.7 | 1 | 1 | 0.9 | 0.8 | 1 | 0.5 |
| | monoethanol amine | | 1 | 1 | 1 | 1 | 2 | 0.7 | 1 | 1 | 0.9 | 0.8 | 1 | 0.5 |
| Polar solvent | dimethyl sulfoxide | | 81 | 81 | 81 | 81 | 80 | 87 | 81 | 81 | 84 | 85 | 81 | 90 |
| Property of each polyacrylonitrile | concentration of S component | µg/g | 1600 | 1600 | 1600 | 1600 | 1600 | 1600 | 800 | 200 | 300 | 200 | 2800 | 40 |
| | number average molecular weight Mn | | 64000 | 64000 | 64000 | 64000 | 64000 | 64000 | 54000 | 75000 | 160000 | 200000 | 50000 | 310000 |
| | molecular weight distribution Mw/Mn | | 3.0 | 3.0 | 3.0 | 3.0 | 3.0 | 3.0 | 4.0 | 4 | 2 | 4 | 3.3 | 3.3 |
| Flame resistant polymer | concentration of S component | µg/g | 1400 | 1400 | 1400 | 1500 | 1400 | 1400 | 700 | 150 | 200 | 150 | 2500 | 20 |
| Yarn producing property | | | A | A | A | A | A | A | A | A | A | A | B | B |
| Number of fluffs | | number/Km | 54 | 50 | 59 | 55 | 67 | 40 | 51 | 50 | 32 | 49 | 81 | 121 |
| Flame resistance | | % | 40 | 41 | 41 | 40 | 39 | 38 | 44 | 46 | 52 | 54 | 36 | 51 |

TABLE 3

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Poly-acrylonitrile | PAN solution (h) | part by weight | 75 | | | | | |
|  | PAN(i) |  |  | 15 | 15 | 15 | 15 | 15 |
| Nitro compound | orthonilrophenol |  | 2.0 | 2.0 | | | | |
|  | methanitrophenol |  |  |  | 2.0 | | | |
|  | orthonitrotoluene |  |  |  |  | 2.0 | | |
|  | nitrobenzene |  |  |  |  |  | 2.0 | 2.0 |
| Amine | N-aminoethyl ethanol amine |  | 1 | 1 | 1 | 1 | 1 | 1 |
|  | monoethanol amine |  | 1 | 1 | 1 | 1 | 1 | 2 |
| Polar solvent | dimethyl sulfoxide |  | 21 | 82 | 82 | 82 | 82 | 82 |
| Property of each poly-acrylonitrile | concentration of S component | μg/g | 1800 | 3500 | 3500 | 3500 | 3500 | 3500 |
|  | number average molecular weight Mn |  | 200000 | 45000 | 45000 | 45000 | 45000 | 45000 |
|  | molecular weight distribution Mw/Mn |  | 3 | 3.7 | 3.7 | 3.7 | 3.7 | 3.7 |
| Flame resistant Polymer | concentration of S component | μg/g | 1700 | 3300 | 3300 | 3300 | 3200 | 3300 |
| Yarn producing Property |  |  | C | D | D | D | D | D |
| Number of fluffs |  | number/Km | 178 | 172 | 190 | 181 | 178 | 191 |
| Flame resistance |  | % | 23 | 29 | 27 | 28 | 28 | 27 |

INDUSTRIAL APPLICABILITY

The flame resistant polymer, the polymer solution and the flame resistant fiber can be applied to any field required with flame resistance, and the carbon fiber can be applied to any field additionally required with high mechanical properties.

The invention claimed is:

1. A flame resistant polymer obtained by reacting polyacrylonitrile with amine and nitro compounds, said polyacrylonitrile being polymerized by aqueous suspension polymerization with a redox initiator and containing an S component at an amount of 3,000 μg/g or less, wherein said polyacrylonitrile has a number average molecular weight Mn of 30,000 or more and 300,000 or less, and a molecular weight distribution (Mw/Mn), which is a ratio of a weight average molecular weight Mw to said number average molecular weight Mn, of 1 or more and 5 or less.

2. The flame resistant polymer according to claim 1, wherein said polyacrylonitrile is polymerized with a persulfate-based oxidant as an oxidant for combination of said redox initiator in an amount of 0.5 to 6 wt % relative to acrylonitrile.

3. The flame resistant polymer according to claim 1, wherein said polyacrylonitrile is polymerized with a sulfite-based reductant as a reductant for combination of said redox initiator in an amount of 0.25 to 3 wt % relative to acrylonitrile.

4. The flame resistant polymer according to claim 1, wherein a content of an S component is 3,000 μg/g or less.

5. A polymer solution containing a flame resistant polymer according to claim 1 and an organic solvent.

6. A flame resistant fiber prepared by solution spinning a polymer solution according to claim 5.

7. A method of producing a carbon fiber comprising a step of carbonizing the flame resistant fiber according to claim 6.

8. The flame resistant polymer according to claim 2, wherein said polyacrylonitrile is polymerized with a sulfite-based reductant as a reductant for combination of said redox initiator in an amount of 0.25 to 3 wt % relative to acrylonitrile.

9. The flame resistant polymer according to claim 2, wherein a content of an S component is 3,000 μg/g or less.

10. The flame resistant polymer according to claim 3, wherein a content of an S component is 3,000 μg/g or less.

* * * * *